United States Patent

Zimmerman et al.

Patent Number: 5,001,656
Date of Patent: Mar. 19, 1991

[54] AMBIENT TEMPERATURE MONITORING TECHNIQUE

[75] Inventors: Eugene S. Zimmerman, Brownstown; Larry R. Hartwick, Auburn Heights, both of Mich.

[73] Assignee: Chrysler Corporation, Highland Park, Mich.

[21] Appl. No.: 27,083

[22] Filed: Mar. 16, 1987

Related U.S. Application Data

[63] Continuation of Ser. No. 646,874, Sep. 4, 1984, abandoned.

[51] Int. Cl.$^5$ .......................... F02D 5/02; F02B 3/12; G08B 21/00
[52] U.S. Cl. .............................. 364/557; 364/431.11; 364/571.03; 374/133; 374/144
[58] Field of Search .................. 364/557, 571, 431.11, 364/431.01; 340/57, 939; 374/100, 109, 133, 142, 144

[56] References Cited

U.S. PATENT DOCUMENTS

| | | | |
|---|---|---|---|
| 4,214,308 | 7/1980 | Carp | 364/431.11 |
| 4,309,759 | 1/1982 | Tokuda et al. | 364/431.05 |
| 4,551,801 | 11/1985 | Sokol | 364/580 |
| 4,564,916 | 1/1986 | Hori et al. | 364/431.1 |
| 4,574,265 | 3/1986 | Kaiser et al. | 364/431.01 |
| 4,580,221 | 4/1986 | Isobe et al. | 364/431.11 |

Primary Examiner—H. Herndon
Attorney, Agent, or Firm—Mark P. Calcaterra

[57] ABSTRACT

A control strategy for accurately monitoring the ambient air temperature surrounding a vehicle in such a way as to compensate for the heat generated by the electronic components and generated by the engine.

5 Claims, 1 Drawing Sheet

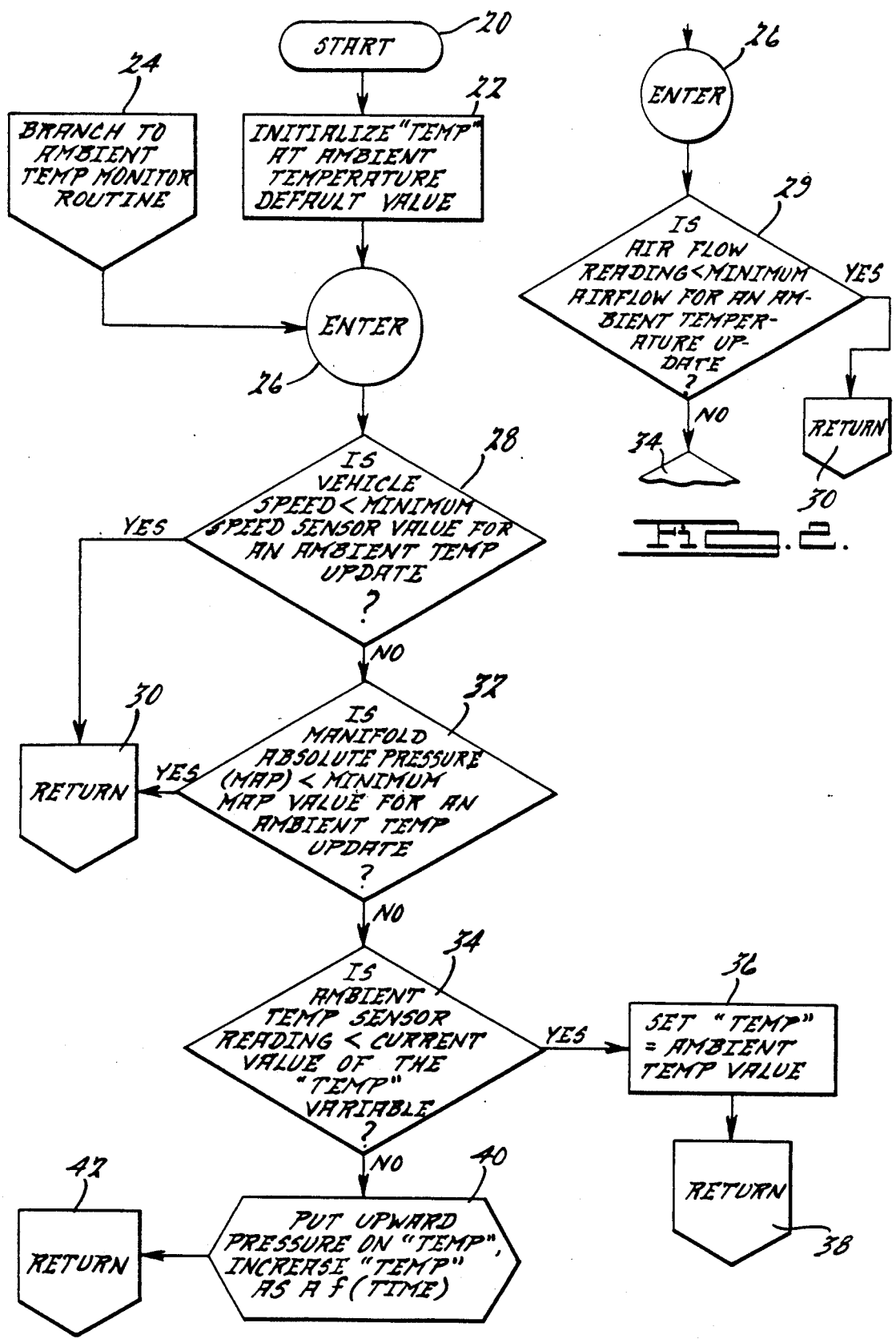

AMBIENT TEMPERATURE MONITORING TECHNIQUE

This application is a continuation of application Ser. No. 06/646,874, now abandoned, filed 9/14/84.

SUMMARY OF THE INVENTION

In electronic control systems for engines, especially those with turbochargers, it is often desirable and perhaps necessary to know the ambient air temperature reading.

Many engine combustion phenomena are dependent on ambient air or inlet air temperature. These includes combustion, burn rate, knock sensitivity, power output, emission formation, and combustion efficiency. Other engine support equipment such as the cooling system or fuel delivery system could be optimized if the ambient air temperature is considered.

The difficulty encountered in measuring the ambient temperature is twofold. First, the temperature sensor is possibly mounted near the electronics which is used to excite the temperature sensor and to read its output. Since the electronics may generate a significant amount of heat during its operation, this heat can distort the actual ambient temperature which the temperature sensor sees. Without some type of compensation, the temperature sensor then would be reading the heat which is generated on the circuitboard by the electronic components rather than the ambient air temperature. Second, the temperature sensor is typically located in the engine inlet air stream and, therefore, is significantly affected by the temperature generated by the operation of the engine. Once again, this temperature will significantly distort the ambient air temperature reading that the temperature sensor picks up.

It is, therefore, an object of this invention to provide a method which allows a temperature sensor to accurately record the ambient air temperature rather than the ambient air temperature as distorted by the heat from the electronic components and heat from the engine compartment.

DESCRIPTION OF THE DRAWINGS

Other objects, features and advantages of the present invention will become more fully apparent from the following detailed description of the preferred embodiment, the appended claims and in the accompanying drawing in which:

The FIG. 1 is a flow chart which illustrates the steps involved in the subject ambient temperature monitoring technique.

FIG. 2 is an alternative embodiment which shows the method modified for use with airflow responsive components.

DETAILED DESCRIPTION OF THE PREFERRED EMBODIMENT

The technique described herein is useful in an engine's electronic control system and is particularly useful in any control system employing a computer in the process of ambient temperature measurement.

It is assumed that transducers to measure such parameters as temperature, manifold absolute pressure (MAP), engine speed, vehicle speed and airflow are present where required.

Referring to FIG. 1, the technique is entered a bubble 20 upon initial start up of the vehicle. At this point, a variable entitled "TEMP" is initialized. This occurs in block 22 by setting the "TEMP" variable to an ambient temperature default value which has been stored in memory. This value is selected to provide adequate, but not optimum, engine combustion as the actual ambient temperature has not yet been sensed.

The main part of the routine is now entered at block 24 with the "TEMP" variable initialized. If the vehicle has already been in operation, the "TEMP" variable will have been already affected by the current operating conditions. The ambient temperature monitoring technique will be accessed at different points according to the predetermined control strategy stored in memory. At designated intervals, or upon interrupts, the control strategy will branch to the ambient temperature monitoring technique via block 24 and enter the routine at bubble 26. If the entry to the technique has occurred in a non-start up situation, the "TEMP" variable will hold current ambient temperature data as opposed to the initialized default value. Regardless of the origin of the value stored in the "TEMP" variable, the routine will proceed in the same fashion from this point forward.

The technique proceeds to determine whether the vehicle speed is less than a predetermined minimum speed sensor value. This occurs in decision block 28. The minimum speed sensor value is that value above which an ambient temperature update is required. The minimum speed sensor value is that which will provide sufficient airflow to be assured of sensing ambient air temperature, not the temperature of the electronic and/or engine components. One good method of gauging airflow in the steady state is to use vehicle speed; as the vehicle speed increases, so does the airflow.

It is to be appreciated that, instead of vehicle speed, the engine speed could be substituted with comparable results. If the vehicle speed is less than the predetermined minimum speed sensor value required for an ambient temperature update, there is no ambient temperature update and the technique is exited via block 30 thereby releasing the computer to return to various other segments of the control strategy.

If the vehicle speed is greater than the minimum speed sensor value for an ambient temperature update, another decision block 32 is entered. This decision block compares the manifold absolute pressure (MAP) to a predetermined minimum MAP value required for an ambient temperature update. If the actual MAP is less than the minimum MAP value, the technique is exited via block 3 and the control strategy of the computer is released to other segments of the control strategy.

If the actual MAP value is greater than the minimum MAP value required for an ambient temperature update, another decision block is entered. This is decision block 34.

Although vehicle speed can provide good airflow correlation, it needs support from either the throttle position or MAP sensor. This is needed due to frequent vehicle decelerations which may occur at high vehicle speeds where the airflow requirement is quite low and, therefore, not a good time to get a reliable temperature reading. MAP is chosen as it can compensate for airflow changes with elevation while throttle position cannot. The minimum MAP value must be determined experimentally, but is typically a level seen during acceleration (when the airflow is high).

An alternative embodiment in FIG. 2 employs the airflow as detected by an airflow meter instead of vehicle speed, engine speed and/or MAP to determine when to update the "TEMP" variable.

Decision block 34 compares the ambient temperature sensor reading to the current value of the "TEMP" variable. If the ambient temperature sensor reading is less than the current value of the "TEMP" variable, then the "TEMP" variable is set to the new ambient temperature value in block 36 for use elsewhere in the engine control strategy and then the computer is released to handle other tasks in the engine control strategy via block 38.

If the ambient temperature sensor reading is greater than the current value of the "TEMP" variable, the technique then puts upward pressure on the "TEMP" variable in block 40. That is, the "TEMP" variable is increased as a function of time. The purpose of this upward pressure is to compensate for sharp increases in electronic component generated heat and engine temperature while not ignoring the possibility that the ambient temperature is actually increasing. These conditions normally occur during an engine malfunction, a heavy load on the engine, or an extended idle condition. These conditions are particularly present in city (stop and go) traffic.

The rate of upward pressure on the "TEMP" variable when a higher temperature is encountered is determined by two items: the maximum expected rate of change in the increasing direction of ambient temperature and the tolerance of the system to ambient air temperature in accuracies and their resulting impact on the system.

In general, this technique permits a rather high rate of upward pressure while maintaining very good accuracy.

Once the upward pressure is exerted or set up to be exerted on the "TEMP" variable block 40, the computer is released to return to other segments of the engine control strategy via block 42. The whole technique will be branched to via block 24 during the next scheduled ambient temperature update or other interrupt conditions which also require an update.

While the present invention has been disclosed in connection with the preferred embodiment thereof, it should be understood that there may be other embodiments which fall within the spirit and scope of the invention and that the invention is susceptible to modification, variation and change without departing from the proper scope of fair meaning of the following claims:

We claim:

1. In an electronic control system for an engine in a vehicle, a system having sensors with capability to monitor various engine and vehicle parameters, some of which include manifold absolute pressure (MAP), vehicle speed, engine speed, airflow, and ambient temperature, the system also having memory means for storing data values representing the various engine and vehicle parameters as variables, as well as for storing predetermined control strategies and, as well as for storing predetermined minimum and default values for the various engine and vehicle parameters as variables, the system further having computer means for utilizing combinations of the data values, default values and variables along with the control strategies to control the engine, a predetermined control strategy to accurately monitor ambient temperature comprising:

initializing an ambient temperature variable with a predetermined ambient temperature default value;

comparing to determine whether the actual vehicle speed is less than a predetermined minimum vehicle speed value corresponding to the minimum vehicle speed desired for an update of the ambient temperature variable;

comparing to determine whether the actual MAP value is less than a predetermined minimum MAP value corresponding to the minimum MAP value desired for an update of the ambient temperature variable, if the actual vehicle speed is greater than the predetermined minimum vehicle speed value corresponding to the minimum vehicle speed desired for an update of the ambient temperature variable;

comparing to determine whether the actual ambient temperature value is less than the ambient temperature variable, if the actual MAP value is greater than the predetermined minimum MAP value is greater than the predetermined minimum MAP value corresponding to the minimum MAP value desired for an update of the ambient temperature variable;

setting the ambient temperature variable equal to the actual ambient temperature value, if the actual ambient temperature value is less than the current value of the ambient temperature variable; and increasing the value of the ambient temperature variable as a function of time to place an upward pressure on the value of the variable thusly compensating for increasing temperatures generated by the engine and the electronic control system, if the actual ambient temperature value is less than the current value of the ambient temperature variable.

2. In an electronic control system for an engine in a vehicle, a system having sensors with capability to monitor various engine and vehicle parameters, some of which include manifold absolute pressure (MAP), vehicle speed, engine speed, airflow, and ambient temperature, the system also having memory means for storing data values representing the various engine and vehicle parameters as variables, as well as for storing predetermined control strategies and, as well as for storing predetermined minimum and default values of the various engine and vehicle parameters as variables, the system further having computer means for utilizing combinations of the data values, default values and variables along with the control strategies to control the engine, a predetermined control strategy to accurately monitor ambient temperature comprising:

initializing an ambient temperature variable with a predetermined ambient temperature default value;

comparing to determine whether the actual vehicle speed is less than a predetermined minimum engine speed value corresponding to the minimum engine speed desired for an update of the ambient temperature variable;

comparing to determine whether the actual MAP value is less than a predetermined minimum MAP value corresponding to the minimum MAP value desired for an update of the ambient temperature variable, if the actual engine speed is greater than the predetermined minimum engine speed value corresponding to the minimum engine speed desired for an update of the ambient temperature variable;

comparing to determine whether the actual ambient temperature value is less than the ambient temperature variable, if the actual MAP value is greater than the predetermined minimum MAP value corresponding to the minimum MPA value desired for an update of the ambient temperature variable;

setting the ambient temperature variable equal to the actual ambient temperature value, if the actual ambient temperature value is less than the current value of the ambient temperature variable; and increasing the value of the ambient temperature variable as a function of time to place an upward pressure on the value of the variable thusly compensating for increasing temperatures generated by the engine and the electronic control system, if the actual ambient temperature value is less than the current value of the ambient temperature variable.

3. In an electronic control system for an engine in a vehicle, a system having sensor with capability to monitor various engine and vehicle parameters, some of which include manifold absolute pressure (MAP), vehicle speed, engine speed, airflow, and ambient temperature, the system also having memory means for storing data values representing the various engine and vehicle parameters as variables, as well as for storing predetermined control strategies and, as well as for storing predetermined minimum and/or default values for the various engine and vehicle parameters as variables, the system further having computer means for utilizing combinations of the data values, default values and variables along with the control strategies to control the engine, a predetermined control strategy to accurately monitor ambient temperature comprising:

initializing an ambient temperature variable with a predetermined ambient temperature default value;

comparing to determine whether the actual airflow is less than a predetermined minimum airflow value corresponding to the minimum airflow desired for an update of the ambient temperature variable;

setting the ambient temperature variable equal to the actual ambient temperature value, if the actual ambient temperature value is less than the current value of the ambient temperature variable; and increasing the value of the ambient temperature variable as a function of time to place an upward pressure on the value of the variable thusly compensating for increasing temperatures generated by the engine and the electronic control system, if the actual ambient temperature value is less than the current value of the ambient temperature variable.

4. In an electronic control system for an engine in a vehicle, a system having sensors with capability to monitor various engine and vehicle parameters, some of which include throttle speed, manifold absolute pressure (MAP), vehicle speed, engine speed, airflow, and ambient temperature, the system also having memory means for storing data values representing the various engine and vehicle parameters as variables, as well as for storing predetermined control strategies and, as well as for storing predetermined minimum and default values for the various engine and vehicle parameters as variables, the system further having computer means for utilizing combinations of the data values, default values and variable along with the control strategies to control the engine, a predetermined control strategy to accurately monitor ambient temperature comprising:

initializing an ambient temperature variable with a predetermined ambient temperature default value;

comparing to determine whether the actual vehicle speed is less than a predetermined minimum vehicle speed value corresponding to the minimum vehicle speed desired for an update of the ambient temperature variable;

comparing to determine whether the actual throttle position value is less than a predetermined minimum throttle position values corresponding to the minimum throttle position value desired for an update of the ambient temperature variable, if the actual vehicle speed is greater than the predetermined minimum vehicle speed value corresponding to the minimum vehicle speed desired for an update of the ambient temperature variable;

comparing to determine whether the actual ambient temperature value is less than the ambient temperature variable, if the actual throttle position value is greater than the predetermined minimum throttle position value is greater than the predetermined minimum throttle position value corresponding to the minimum throttle position value desired for an update of the ambient temperature variable;

setting the ambient temperature variable equal to the actual ambient temperature value, if the actual ambient temperature value is less than the current value of the ambient temperature variable; and increasing the value of the ambient temperature variable as a function of time to place an upward pressure on the value of the variable thusly compensating for increasing temperatures generated by the engine and the electronic control system, if the actual ambient temperature value is less than the current value of the ambient temperature variable.

5. In an electronic control system for an engine in a vehicle, a system having sensors with capability to monitor various engine and vehicle parameters, some of which include throttle position, manifold absolute pressure (MAP), vehicle speed, engine speed, airflow, and ambient temperature, the system also having memory means for storing data values representing the various engine and vehicle parameters as variables, as well as for storing predetermined control strategies and, as well as for storing predetermined minimum and default values for the various engine and vehicle parameters as variables, the system further having computer means for utilizing combinations of the data values, default values and variables along with the control strategies to control the engine, a predetermined control strategy to accurately monitor ambient temperature comprising:

initializing an ambient temperature variable with a predetermined ambient temperature default value;

comparing to determine whether the actual vehicle speed is less than a predetermined minimum engine speed value corresponding to the minimum engine speed desired for an update of the ambient temperature variable;

comparing to determine whether the actual throttle position value is less than a predetermined minimum throttle position value corresponding to the minimum throttle position value desired for an update of the ambient temperature variable, if the actual engine speed is greater than the predetermined minimum engine speed value corresponding to the minimum engine speed desired for an update of the ambient temperature variable;

comparing to determine whether the actual ambient temperature value is less than the ambient temperature variable, if the actual throttle position value is greater than the predetermined minimum throttle position value corresponding to the minimum throttle position value desired for an update of the ambient temperature variable;

setting the ambient temperature variable equal to the actual ambient temperature value, if the actual ambient temperature value is less than the current value of the ambient temperature variable; and increasing the value of the ambient temperature variable as a function of time to place an upward pressure on the value of the variable thusly compensating for increasing temperatures generated by the engine and the electronic control system, if the actual ambient temperature value is less than the current value of the ambient temperature variable.

* * * * *